United States Patent
Kim et al.

(10) Patent No.: US 9,242,567 B2
(45) Date of Patent: Jan. 26, 2016

(54) CHARGE APPARATUS AND ELECTRIC VEHICLE INCLUDING THE SAME

(71) Applicant: LG ELECTRONICS INC., Seoul (KR)

(72) Inventors: Jungbum Kim, Seoul (KR); Chanheung Park, Seoul (KR); Donghee Kim, Seoul (KR); Yunchul Jung, Seoul (KR); Byoungkuk Lee, Seoul (KR); Seunghee Ryu, Seoul (KR); Sanghoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 13/759,169

(22) Filed: Feb. 5, 2013

(65) Prior Publication Data

US 2013/0271077 A1    Oct. 17, 2013

(30) Foreign Application Priority Data

Feb. 6, 2012   (KR) .................. 10-2012-0011989

(51) Int. Cl.
*H02J 7/00*   (2006.01)
*B60L 11/18*  (2006.01)
(Continued)

(52) U.S. Cl.
CPC ......... *B60L 11/1811* (2013.01); *B60L 11/1812* (2013.01); *H02J 7/0052* (2013.01);
(Continued)

(58) Field of Classification Search
CPC ............ B60L 11/1811; B60L 11/1812; B60L 2210/12; B60L 2210/14; H02J 7/0052; H02J 7/022; H02M 3/1582; H02M 2003/1586; Y02T 10/92; Y02T 10/7005; Y02T 90/14; Y02T 10/7225; Y02T 10/7233; Y02T 90/127
USPC ........................................................ 320/109
See application file for complete search history.

(56) References Cited

U.S. PATENT DOCUMENTS

| 7,170,268 B2 * | 1/2007 | Kim ............................ 323/272 |
| 2006/0152085 A1 * | 7/2006 | Flett et al. .................... 307/75 |
| 2013/0077362 A1 * | 3/2013 | Kumar ......................... 363/49 |

FOREIGN PATENT DOCUMENTS

| CN | 101095278 A | 12/2007 |
| CN | 101540568 A | 9/2009 |

(Continued)

OTHER PUBLICATIONS

Jiang, Jiang-feng et al., *Research on Parallel Interleaved Analog PFC Using Double Closed Loop Control*, Sep. 2011, vol. 45, No. 9, pp. 95-97, Power Electronics, China.

(Continued)

*Primary Examiner* — Jack Chiang
*Assistant Examiner* — Brandon Bowers
(74) *Attorney, Agent, or Firm* — Ked & Associates, LLP

(57) ABSTRACT

A charging apparatus and an electric vehicle including the same are disclosed. The charging apparatus includes a rectifier to rectify input alternating current (AC) power in a charging mode, an interleaved buck-boost converter to convert the rectified power into direct current (DC) power to supply the converted DC power to a battery, the interleaved buck-boost converter including a plurality of buck-boost converters, and a converter controller to control the interleaved buck-boost converter, wherein a first buck-boost converter of the interleaved buck-boost converter includes a first buck switching element connected to the rectifier, a first boost switching element, an inductor connected between the first buck switching element and the first boost switching element, a first diode connected in parallel between the first buck switching element and the inductor, and a second diode connected between the first boost switching element and an output of the interleaved buck-boost converter.

17 Claims, 10 Drawing Sheets

(51) Int. Cl.
*H02M 3/158* (2006.01)
*H02J 7/02* (2006.01)

(52) U.S. Cl.
CPC ............ *H02J 7/022* (2013.01); *H02M 3/1582* (2013.01); *B60L 2210/12* (2013.01); *B60L 2210/14* (2013.01); *H02M 2003/1586* (2013.01); *Y02T 10/7005* (2013.01); *Y02T 10/7225* (2013.01); *Y02T 10/7233* (2013.01); *Y02T 10/92* (2013.01); *Y02T 90/127* (2013.01); *Y02T 90/14* (2013.01)

(56) References Cited

FOREIGN PATENT DOCUMENTS

| | | |
|---|---|---|
| JP | 2011-172372 A | 9/2011 |
| KR | 10-0944528 B1 | 3/2010 |

OTHER PUBLICATIONS

Chinese Office Action dated Aug. 5, 2014 issued in Application No. 201310047338.8.
Kwak, Dong-Kurl: "A Study on PFC Buck-Boost AC-DC Converter of Soft Switching"; The Transactions of the Korean Institute of Power Electronics; vol. 12, Issue 6; Dec. 2007; pp. 465-471; The Korean Institute of Power Electronics (English Abstract and Full Korean Text).
Korean Office Action dated Dec. 12, 2012 issued in Application No. 10-2012-0011989.
Korean Notice of Allowance dated Mar. 3, 2014 issued in Application No. 10-2012-0011989.

* cited by examiner

S₂ is on, S₁ on

S₂ is off, S₁ on $S_1$ is on, $S_2$ off $S_1$ is off, $S_2$ off

S₂ is on, S₁ on

S₁ is off, S₂ off (a)

(b)

(c)

CHARGE APPARATUS AND ELECTRIC VEHICLE INCLUDING THE SAME

CROSS-REFERENCE TO RELATED APPLICATION

This application claims the priority benefit of Korean Patent Application No. 10-2012-0011989, filed on Feb. 6, 2012 in the Korean Intellectual Property Office, the disclosure of which is incorporated herein by reference.

BACKGROUND OF THE INVENTION

1. Field of the Invention

The present invention relates to a charging apparatus and an electric vehicle including the same, and more particularly to a charging apparatus capable of stably performing charging using alternating current (AC) power and an electric apparatus including the same.

2. Description of the Related Art

Internal combustion engine vehicles are indispensable to human lives but have caused air pollution and energy depletion due to enormous energy consumption. Accordingly, instead of automobiles using an internal combustion engine, electric cars using electricity as power or hybrid cars using a combination of an internal combustion engine and electricity have been developed and used.

Meanwhile, such electric or hybrid cars generate output using motors and batteries and various attempts have been made to improve output and range.

SUMMARY OF THE INVENTION

Therefore, the present invention has been made in view of the above problems, and it is an object of the present invention to provide a charging apparatus capable of stably performing charging using AC power and an electric vehicle including the same.

In accordance with an aspect of the present invention, the above and other objects can be accomplished by the provision of a charging apparatus, including a rectifier to rectify input alternating current (AC) power in a charging mode, an interleaved buck-boost converter to convert the rectified power into direct current (DC) power to supply the converted DC power to a battery, the interleaved buck-boost converter including a plurality of buck-boost converters, and a converter controller to control the interleaved buck-boost converter, wherein a first buck-boost converter of the interleaved buck-boost converter includes a first buck switching element connected to the rectifier, a first boost switching element, a first inductor connected between the first buck switching element and the first boost switching element, a first diode connected in parallel between the first buck switching element and the first inductor, and a second diode connected between the first boost switching element and an output of the interleaved buck-boost converter.

In accordance with another aspect of the present invention, there is provided a charging apparatus, including a rectifier to rectify input alternating current (AC) power in a charging mode, an interleaved buck-boost converter to convert the rectified power into direct current (DC) power to supply the converted DC power to a battery, the interleaved buck-boost converter including a plurality of buck-boost converters, and a converter controller to control the interleaved buck-boost converter, wherein each of the plurality of buck-boost converters performs an interleaving operation, and a turn-on timing of a first buck switching element in a first buck-boost converter of the interleaved buck-boost converter and a turn-on timing of a second buck switching element in a second buck-boost converter of the interleaved buck-boost converter partially overlap in a buck mode or a buck-boost mode.

In accordance with still another aspect of the present invention, there is provided an electric vehicle, including a battery, a motor, an inverter to convert direct current (DC) power provided from the battery into alternating current (AC) power to drive the motor, in a motor operation mode, and a charging apparatus which includes a rectifier to rectify input AC power in a charging mode, an interleaved buck-boost converter to convert the rectified power into DC power to supply the converted DC power to the battery, the interleaved buck-boost converter including a plurality of buck-boost converters, and a converter controller to control the interleaved buck-boost converter, wherein a first buck-boost converter of the interleaved buck-boost converter includes a first buck switching element connected to the rectifier, a first boost switching element, a first inductor connected between the first buck switching element and the first boost switching element, a first diode connected in parallel between the first buck switching element and the first inductor, and a second diode connected between the first boost switching element and an output of the interleaved buck-boost converter.

In accordance with a further aspect of the present invention, there is provided an electric vehicle, including a battery, a motor, an inverter to convert direct current (DC) power provided from the battery into alternating current (AC) power to drive the motor, in a motor operation mode, and a charging apparatus including a rectifier to rectify input AC power in a charging mode, an interleaved buck-boost converter to convert the rectified power into DC power to supply the converted DC power to the battery, the interleaved buck-boost converter including a plurality of buck-boost converters, and a converter controller to control the interleaved buck-boost converter, wherein each of the plurality of buck-boost converters performs an interleaving operation, and a turn-on timing of a first buck switching element in a first buck-boost converter of the interleaved buck-boost converter and a turn-on timing of a second buck switching element in a second buck-boost converter of the interleaved buck-boost converter partially overlap in a buck mode or a buck-boost mode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

The suffixes "unit" and "part" used in the following description are given only for the purpose of ease of description of the present specification and do not have an important meaning or role in and of themselves. Accordingly, "unit" and "part" are interchangeably used.

Figure 1:
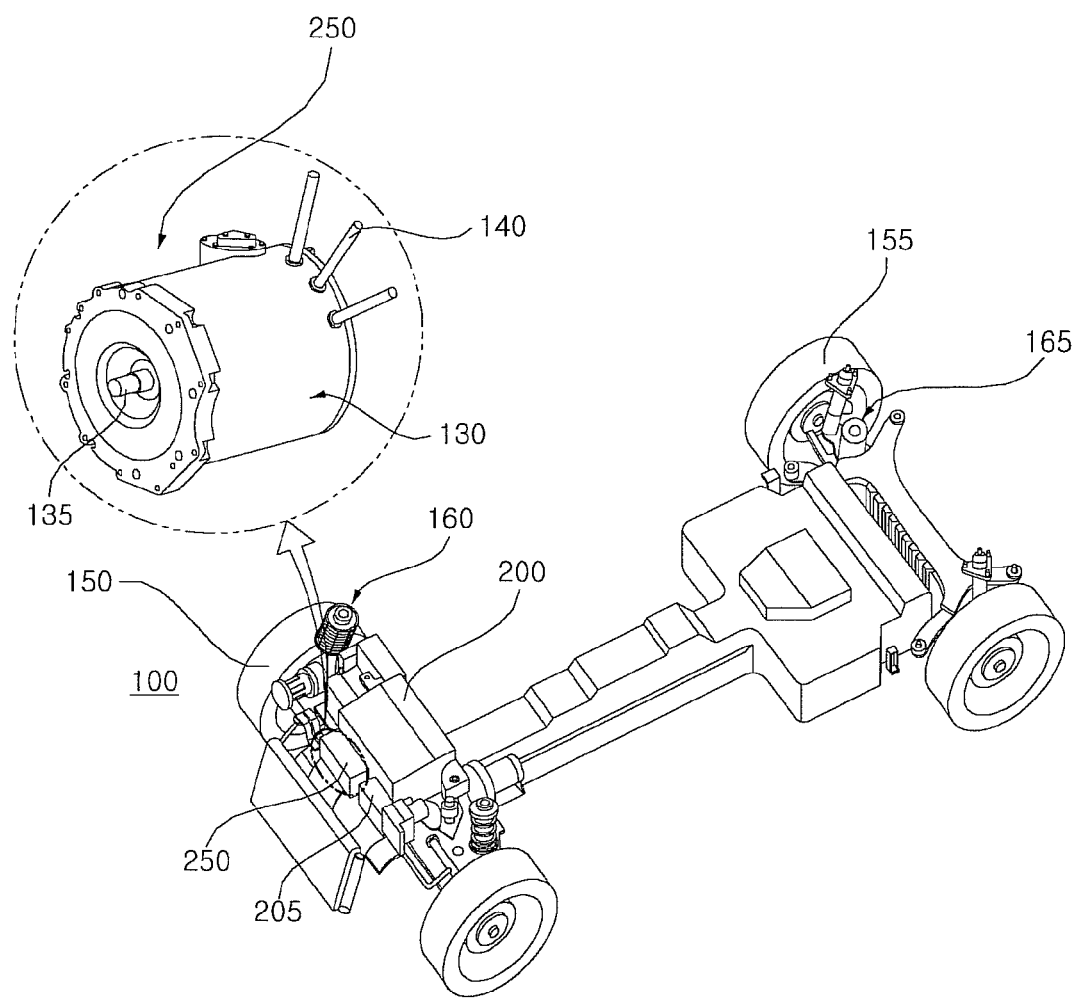
FIG. 1 is a diagram schematically illustrating the body of an electric vehicle according to an exemplary embodiment of the present invention.

FIG. 1 is a diagram schematically illustrating the body of an electric vehicle according to an exemplary embodiment of the present invention Referring to FIG. 1, an electric vehicle 100 according to the present embodiment may include a battery 205 for supplying power, a motor driver 200 for receiving the power from the battery 205 and driving a motor 250, the motor 250 driven by the motor driver 200 to rotate, a front wheel 150 and a rear wheel 155 rotating by the motor 250, and a front suspension 160 and a rear suspension 165 for preventing vibrations on roads from being transferred to the vehicle body. Meanwhile, the electric vehicle 100 may further include a driving gear (not shown) for adjusting the rate of rotation of the motor 250 according to a gear ratio.

The battery 205 supplies power to the motor driver 200. Specifically, the battery 205 supplies direct current (DC) power to a capacitor (C of FIG. 2) of the motor driver 200.

The battery 205 may be formed of a set of a plurality of unit cells. The plurality of unit cells may be managed by a battery management system (BMS) in order to maintain a constant voltage and may generate the constant voltage by the BMS.

For example, the BMS may detect a voltage of the battery 205 and transfer the detected voltage to an electronic controller (not shown) or to a controller (230 of FIG. 2) in the motor driver 200. If the battery voltage is lowered to a lower limit or less, the BMS may supply the DC power stored in the capacitor (C of FIG. 2) in the motor driver 200 to the battery 205. If the battery voltage is raised to an upper limit or more, the BMS may supply the DC power to the capacitor (C of FIG. 2) in the motor driver 200.

The battery 205 is desirably composed of a chargeable or dischargeable secondary cell but is not limited thereto.

The motor driver 200 receives the DC power from the battery 205 via a power input cable (not shown) in a motor operation mode. The motor driver 200 converts the DC power received from the battery 205 into AC power and supplies the AC power to the motor 250. The converted AC power may be three-phase AC power.

The motor driver 200 supplies the three-phase AC power to the motor 250 through a three-phase output cable (not shown) provided in the motor driver 200 in the motor operation mode.

In a charging mode, the motor driver 200 may receive input AC power, convert the input AC power into DC power, and supply the DC power to the battery 205. Accordingly, the motor driver 200 may include a charging apparatus (203 of FIG. 2).

In the present specification, although the motor driver 200 includes the charging apparatus (203 of FIG. 2), the motor driver 200 may be the same as the charging apparatus. The following description is based on the case in which the motor driver 200 includes the charging apparatus (203 of FIG. 2).

The motor driver 200 according to the exemplary embodiment of the present invention will be described later with reference to FIG. 2.

The motor 250 includes a stator 130 of a stationary part and a rotor 135 of a rotating part. The motor 250 includes input cables 140 to receive the AC power supplied by the motor driver 200. The motor 250 may be, for example, a three-phase motor. The rotation speed of the rotor of the motor 250 varies according to supplied frequency when voltage/frequency variable AC power of each phase is supplied to a coil of the stator of each phase.

The motor 250 may be an induction motor, a brushless DC (BLDC) motor, or a reluctance motor.

The driving gear (not shown) may be installed at one side of the motor 250. The driving gear converts the rotation energy of the motor 250 according to a gear ratio. The rotation energy generated from the driving gear is transferred to the front wheel 150 and/or the rear wheel 155 to cause the electric vehicle 100 to move.

The front suspension 160 and the rear suspension 165 support the front wheel 150 and the rear wheel 155, respectively, against the vehicle body. The upper and lower directions of the front suspension 160 and the rear suspension 165 are supported by springs or dampers so that road vibration is not transferred to the vehicle body.

The front wheel 150 may include a steering system (not shown). The steering system controls the direction of the front wheel 150 to steer the electric vehicle 100.

Although not shown in FIG. 1, the electric vehicle 100 may further include the electronic controller to control electric devices of the electric vehicle 100. The electronic controller controls the operation or display of each device. The electronic controller may control the above-described BMS.

The electronic controller may generate a driving command according to various driving modes (drive mode, reverse mode, neutral mode, park mode, etc.), based on sensing signals from a tilt sensor (not shown) for sensing the tilt of the electric vehicle 100, a speed sensor (not shown) for sensing the speed of the electric vehicle 100, a brake sensor (not shown) for sensing operation of a brake pedal, and an acceleration sensor (not shown) for sensing operation of an accelerator pedal. The driving command may be, for example, a torque command or a speed command.

The electric vehicle 100 according to the present embodiment may be interpreted as including not only a pure electric vehicle using a battery and a motor but also a hybrid electric vehicle using the battery and motor while using an engine. The hybrid electric vehicle may further include a switching means capable of selecting at least one of the battery and the engine and a transmission. The hybrid electric vehicle is divided into a series hybrid type for converting mechanical energy output from the engine into electric energy to drive the motor and a parallel hybrid type which simultaneously uses mechanical energy generated from the engine and electric energy generated from the battery.

Figure 2:
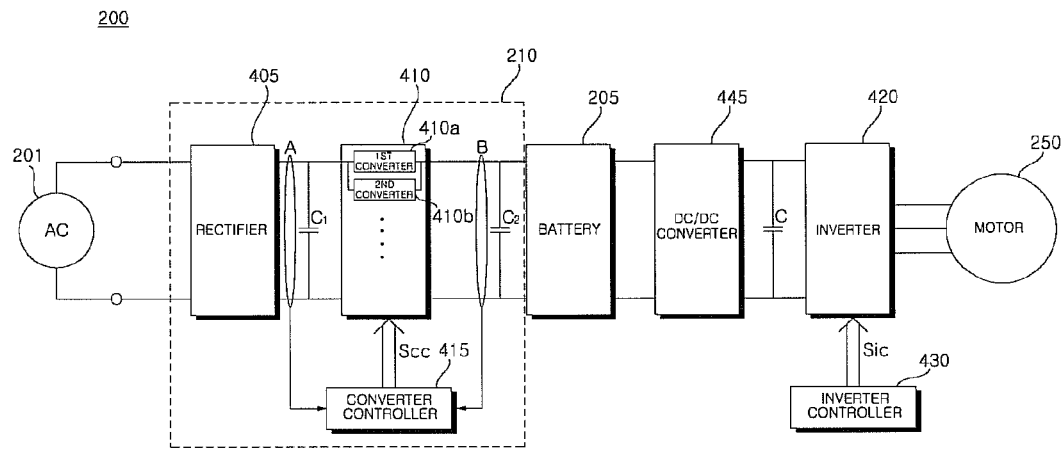
FIG. 2 is a block diagram illustrating the internal configuration of a motor driver in FIG. 1.
Figure 3:
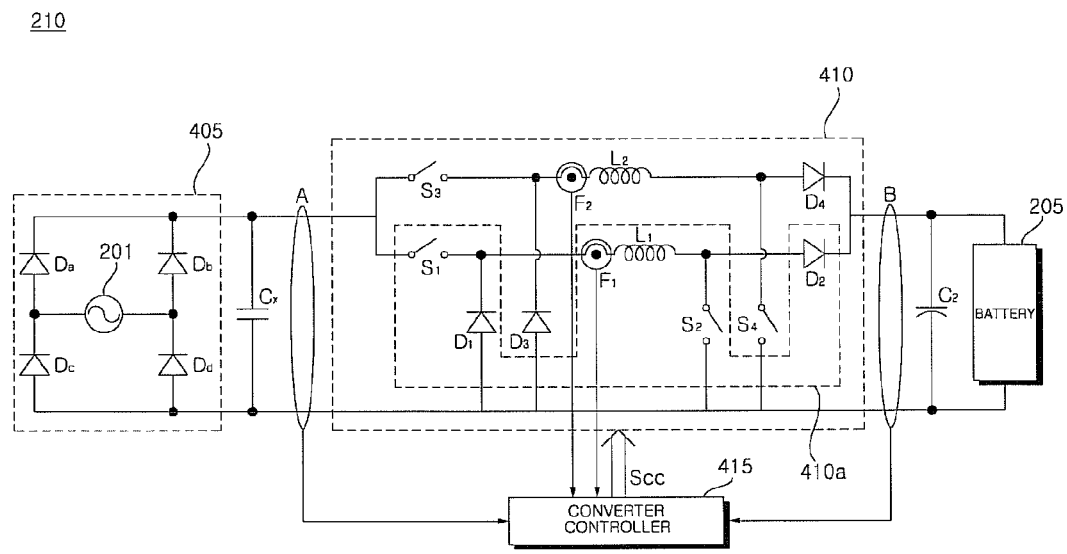
FIG. 3 is a circuit diagram illustrating a charging apparatus in the motor driver of FIG. 2.

FIG. 2 is a block diagram illustrating the internal configuration of a motor driver in FIG. 1 and FIG. 3 is a circuit diagram illustrating a charging apparatus in the motor driver of FIG. 2.

The motor driver 200 according to the present embodiment may include a charging apparatus 203, a battery 205, an inverter 420, an inverter controller 430, and a DC/DC converter 445. The DC/DC converter 445 is an optional element.

The charging apparatus 203 receives input AC power 201, converts the AC power 201 into DC power, and supplies the converted DC power to the battery 205.

To this end, the charging apparatus 203 may include a rectifier 405, a converter 410, and a converter controller 415.

The rectifier 405 rectifies the received input AC power 201. While the rectifier 405 for single-phase AC power in which four diodes $D_a$, $D_b$, $D_c$ and $D_d$ are used in a bridge form is illustrated in FIG. 3, the rectifier 405 may take various forms.

The converter 410 converts the rectified power received from the rectifier 405 into the DC power and supplies the converted DC voltage to the battery 205.

In the present embodiment, the converter 410 uses an interleaved buck-boost converter including a plurality of buck-boost converters 410a, 410b, . . . .

The plurality of buck-boost converters 410a, 410b, . . . , in the interleaved buck-boost converter 410 are connected in parallel with each other to perform an interleaving operation. The plurality of buck-boost converters connected in parallel with each other performs voltage control caused by current distribution through interleaving. Therefore, durability of circuit elements in the interleaved buck-boost converter 410 can be improved.

Meanwhile, in another embodiment of the present invention, if an interleaving operation is performed in a buck mode or buck-boost mode having a low output voltage, turn-on timings of a first buck switching element $S_1$ in the first buck-boost converter 410a and a second buck switching element $S_3$ in the second buck-boost converter 410b are controlled to partially overlap.

That is, in the buck mode or buck-boost mode, each of the plurality of buck-boost converters 410a, 410b, . . . , performs an interleaving operation and turn-on timings of buck switching elements in the respective buck-boost converters 410a, 410b, . . . , partially overlap. Accordingly, a low output voltage can be compensated during an interleaving operation. Namely, the battery can be charged by stably converting input AC power into DC power.

FIG. 3 illustrates the first buck-boost converter 410a and the second buck-boost converter 410b among the plurality of buck-boost converters of the converter 410. Hereinbelow, a description will be given of the first buck-boost converter 410a and the second buck-boost converter 410b among the plurality of buck-boost converters.

The first buck-boost converter 410a may include a first boost switching element $S_2$, a first buck switching element $S_1$ connected to the rectifier 405, an inductor $L_1$ connected between the first buck switching element S1 and the first boost switching element $S_2$, a first diode $D_1$ connected in parallel between the first buck switching element $S_1$ and the inductor $L_1$, and a second diode $D_2$ connected between the first boost switching element $S_2$ and an output of the converter 410.

The second buck-boost converter 410b may include a second boost switching element $S_4$, a second buck switching element $S_3$ connected to the rectifier 405, an inductor $L_2$ connected between the second buck switching element $S_3$ and the second boost switching element $S_4$, a third diode $D_3$ connected in parallel between the second buck switching element $S_3$ and the inductor $L_2$, and a fourth diode $D_4$ connected between the second boost switching element $S_4$ and the output of the converter 410.

Each of the first buck-boost converter 410a and the second buck-boost converter 410b may operate in a buck mode, a boost mode, or a buck-boost mode. This will be described with reference to FIGS. 4A and 4B.

The first buck-boost converter 410a and the second buck-boost converter 410b use the common inductors $L_1$ and $L_2$ for storing energy while operating in the buck mode, boost mode, or buck-boost mode. Accordingly, the internal circuit of the charging apparatus 203 is simplified and the charging apparatus 203 has effects of volume reduction and efficiency improvement.

In the meantime, since the first buck-boost converter 410a and the second buck-boost converter 410b do not distinguish between a buck converter and a boost converter, a capacitor having a large rated voltage does not need to be used. Accordingly, the charging apparatus 203 has a simplified internal circuit, leading to reduction in volume and manufacturing costs.

The charging apparatus 203 may further include a first capacitor C1 connected to an output of the rectifier 405 and a second capacitor C2 connected to an output of the interleaved buck-boost converter 410.

The charging apparatus 203 may further include an input voltage detector A for detecting an output voltage of the rectifier 405, an output voltage detector B for detecting an output voltage of the interleaved buck-boost converter 410, and current detectors F1 and F2 for detecting current flowing into the inductors $L_1$ and $L_2$ in the interleaved buck-boost converter 410.

The input voltage detector A may detect the output voltage of the rectifier 405. Especially, the input voltage detector A may detect a voltage $V_{c1}$ across both terminals of the capacitor $C_1$. To this end, the input voltage detector A may include a resistor, an amplifier, etc. The detected voltage $V_{c1}$ may be input to the converter controller 415 as a discrete signal of a pulse form.

The output voltage detector B may detect the output voltage of the interleaved buck-boost converter 410. Especially, the output voltage detector B may detect a voltage $V_{c2}$ across both terminals of the capacitor $C_2$. Since the capacitor $C_2$ is connected in parallel with the battery 205, the detected output voltage $V_{c2}$ may correspond to a voltage of the battery 205. The detected output voltage $V_{c2}$ may be input to the converter controller 415 as a discrete signal of a pulse form.

The first current detector F1 may detect current $i_{L1}$ flowing into the inductor $L_1$ in the first buck-boost converter 410 and the second current detector F2 detects current $i_{L2}$ flowing into the inductor $L_2$ in the second buck-boost converter 410. Current transformers, shunt resistors, etc. may be used for the first and second current detectors F1 and F2. The detected input currents $i_{L1}$ and $i_{L2}$ may be input to the converter controller 415 as discrete signals of a pulse form.

The converter controller 415 may determine a turn-on duty of the first buck switching element $S_1$ in the first buck-boost converter 410a and a turn-on duty of the second buck switching element $S_3$ in the second buck-boost converter 410b, based on an output voltage $V_{c2}$ of the converter 410 sensed by the output voltage detector B, and on a target output voltage $V^*_{c2}$. This will be described later with reference to FIG. 5B.

For example, if the output voltage $V_{c2}$ of the converter 410 sensed by the output voltage detector B is low, the converter controller 415 may increase the turn-on duty of the first buck switching element $S_1$ and the turn-on duty of the second buck switching element $S_3$ in order to raise the output voltage $V_{c2}$. If the output voltage $V_{c2}$ of the converter 410 sensed by the output voltage detector B is high, the converter controller 415 may decrease the turn-on duty of the first buck switching element $S_1$ and the turn-on duty of the second buck switching element $S_3$ in order to lower the output voltage $V_{c2}$.

The converter controller 415 may determine a turn-on duty of the first boost switching element $S_2$, based on the output voltage $V_{c2}$ of the converter 410 sensed by the output voltage detector B, the target output voltage $V^*_{c2}$, the input voltage $V_{c1}$ of the converter 410 sensed by the input voltage detector A, and the current $i_{L1}$ flowing into the first inductor $L_1$ in the first buck-boost converter 410a. This will be described later with reference to FIG. 5B.

The converter controller 415 may determine a turn-on duty of the second boost switching element $S_4$, based on the output voltage $V_{c2}$ of the converter 410 sensed by the output voltage detector B, the target output voltage $V^*_{c2}$, the input voltage $V_{c1}$ of the converter 410 sensed by the input voltage detector A, and the current $i_{L2}$ flowing into the second inductor $L_2$ in the second buck-boost converter 410b. This will be described later with reference to FIG. 5B.

For example, if a phase difference between the output voltage $V_{c2}$ of the converter 410 and the current $i_{L2}$ flowing into the second inductor $L_2$ is increased, the converter controller 415 may increase or decrease the turn-on duty of the first boost switching element $S_2$ and the turn-on duty of the second boost switching element $S_4$ in order to reduce the phase difference.

The converter controller 415 may control the first buck switching element $S_1$ and the first boost switching element $S_2$ in the first buck-boost converter 410a to be independently operated and may control the second buck switching element $S_3$ and the second boost switching element $S_4$ in the second buck-boost converter 410b to be independently operated, in the buck mode or buck-boost mode. This will be described later with reference to FIG. 5B.

The converter controller 415 outputs a converter switching control signal Scc to the converter 410 in order to control the switching elements $S_1$ and $S_2$ in the first buck-boost converter 410a and the switching elements $S_3$ and $S_4$ in the second buck-boost converter 410b. The converter switching control signal Scc is a switching control signal of a pulse width modulation (PWM) scheme and is generated based on the output voltage $V_{c2}$ sensed by the output voltage detector B, the input voltage $V_{c1}$ sensed by the input voltage detector A, and the currents $i_{L1}$ and $i_{L2}$ sensed by the current detectors F1 and F2.

The inverter 420 may include a plurality of inverter switching elements to convert a DC voltage Vdc smoothed by an turn on/off operation of the switching elements into three-phase AC voltages va, vb, and vc which are input to the three-phase synchronization motor 250.

The inverter 420 includes a pair of serially connected upper arm switching elements Sa, Sb, and Sc and serially connected lower arm switching elements S'a, S'b, and S'c. A total of three pairs of the upper and lower arm switching elements Sa and S'a, Sb and S'b, and Sc and S'c are connected in parallel with each other. Diodes are connected in reverse parallel with the respective switching elements Sa, S'a, Sb, S'b, Sc, and S'c.

The switching elements in the inverter 420 perform turn on/off operations based on an inverter switching control signal Sic supplied by the inverter controller 430.

The inverter 420 converts DC power generated from the battery 205 into AC power in an operation mode of the motor 250 to drive the motor 250.

The inverter controller 430 may control the operations of the switching elements in the inverter 420. The inverter controller 430 may receive output currents $i_o$ detected by an output current detector (E shown in FIG. 8).

The inverter controller 430 outputs the switching control signal Sic to the inverter 420 in order to control the switching operation of the inverter 420. The inverter switching control signal Sic is a switching control signal of a PWM scheme and is generated based on the output current values $I_o$ detected from the output current detector E.

The output current detector (E shown in FIG. 8) may detect the output current $I_o$ flowing between the inverter 420 and the three-phase motor 250. That is, the output current detector detects current flowing into the motor 250. The output current detector E may detect output currents $i_a$, $i_b$, and $i_c$ of all phases or may detect two-phase output currents using three-phase equilibrium.

The output current detector may be positioned between the inverter 420 and the motor 250. Current transformers, shunt resistors, etc. may be used for current detection.

When the shunt resistors are used, three shunt resistors may be connected between the inverter 420 and the motor 250 or one ends of the three shunt resistors may be connected to the three lower arm switching elements S'a, S'b, and S'c, respectively. Meanwhile, two shunt resistors may be used using three-phase equilibrium. If one shunt resistor is used, the corresponding shunt resistor may be connected between the above-described capacitor C and the inverter 420.

The detected output current $i_o$ is a discrete signal of a pulse form and may be applied to the controller 430. The inverter switching control signal Sic is generated based on the detected output current $i_o$. The following description will be given under the assumption that the detected output current $i_o$ is the three-phase output currents $i_a$, $i_b$, and $i_c$.

The DC/DC converter 445 may convert the level of the DC power stored in the battery 205 and output the level-converted DC power to the inverter 420. The DC/DC converter 445 may not be included in the driver 200 as described earlier.

The capacitor C for storing the DC power may be connected between the inverter 420 and the battery 205. The capacitor C may operate as a smoothing capacitor for smoothing and storing input power.

Although one capacitor is illustrated as a smoothing capacitor in FIG. 2, a plurality of smoothing capacitors may be provided to guarantee stability of circuit elements.

In the illustrated example of FIG. 2, the capacitor C is connected between the inverter 420 and the DC/DC converter 445.

Since DC power is stored in both terminals of the capacitor C, both terminals may be called DC terminals or DC link terminals.

The driver 200 may further include a DC-terminal voltage detector (not shown) for detecting a voltage across both terminals of the capacitor C.

The DC-terminal voltage detector may detect a DC-terminal voltage Vdc across both terminals of the smoothing capacitor C. To this end, the DC-terminal voltage detector may include a resistor, an amplifier, etc. The detected DC-terminal voltage Vdc is a discrete signal of a pulse form and may be input to the inverter controller 430.

If the DC/DC converter 445 is not present between the inverter 420 and the battery 205, the DC-terminal voltage Vdc detected from the DC-terminal voltage detector may correspond to the battery voltage $V_{BAT}$.

The converter 410, the rectifier 405, and the converter controller 415 in the charging apparatus 203 may be formed on the same circuit board. This may be called an on board charger (OBC). If the converter 410, the rectifier 405, and the converter controller 415 in the charging circuit 203 are formed on the same circuit board, the charging apparatus 203 may be implemented with a small size.

Hereinafter, operation of the interleaved buck-boost converter will be described. Specifically, operation of the first buck-boost converter 410a will be described.

FIGS. 4A to 4E are diagrams explaining operation of the first buck-boost converter illustrated in FIG. 3.

Figure 4A:
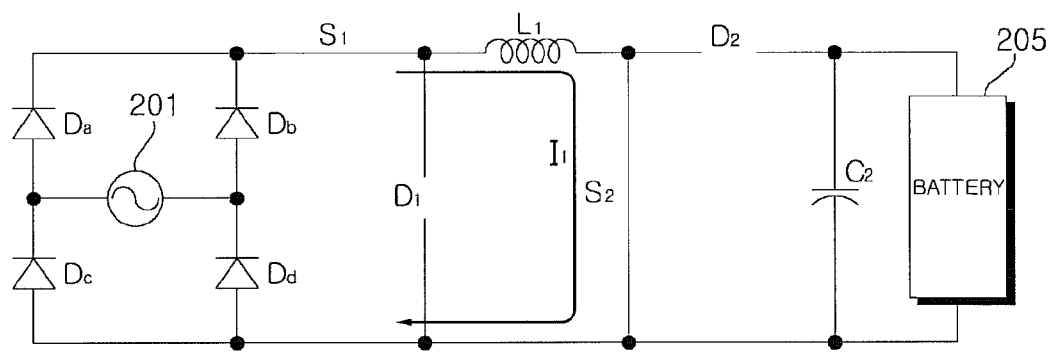
FIGS. 4A to 4F are diagrams explaining operation of a first buck-boost converter in FIG. 3.
Figure 4B:
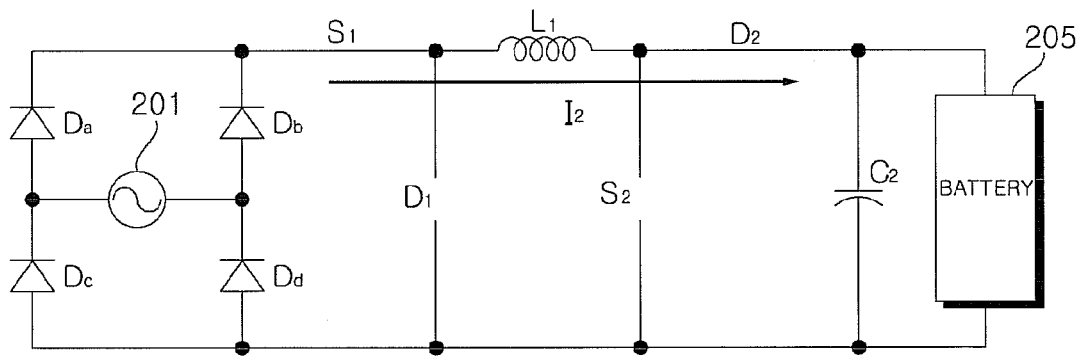

FIGS. 4A and 4B illustrate an exemplary operation of the first buck-boost converter 410a in a boost mode.

Referring to FIG. 4A, if the first buck switching element $S_1$ and the first boost switching element $S_2$ in the first buck-boost converter 410a are turned on, a closed loop is formed by the first buck switching element $S_1$, the first inductor $L_1$, and the first boost switching element $S_2$ so that current $I_1$ flows. Then energy is accumulated in the inductor $L_1$ based on the current $I_1$. The second diode $D_2$ is not turned on.

Referring to FIG. 4B, if the first buck switching element $S_1$ is turned on and the first boost switching element $S_2$ is turned off, a current $I_2$ flows through the first buck switching element $S_1$, the first inductor $L_1$, and the second diode $D_2$. Then energy accumulated in the first inductor $L_1$ in FIG. 4A is stored in the capacitor $C_2$ and the battery 205 by the current $I_2$. Consequently, boosted DC power is stored in the battery 205.

Namely, in the boost mode, the first buck switching element $S_1$ in the first buck-boost converter 410a is continuously turned on and the first boost switching element $S_2$ performs a turn on/off operation, i.e. a PWM operation.

Figure 4C:
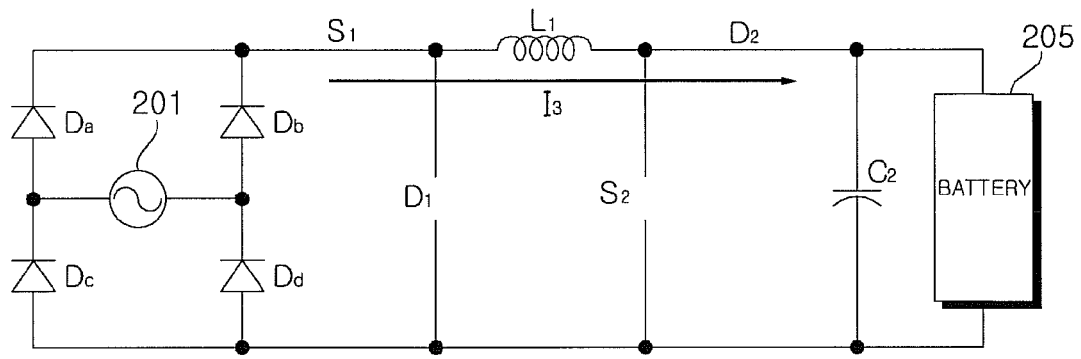
Figure 4D:
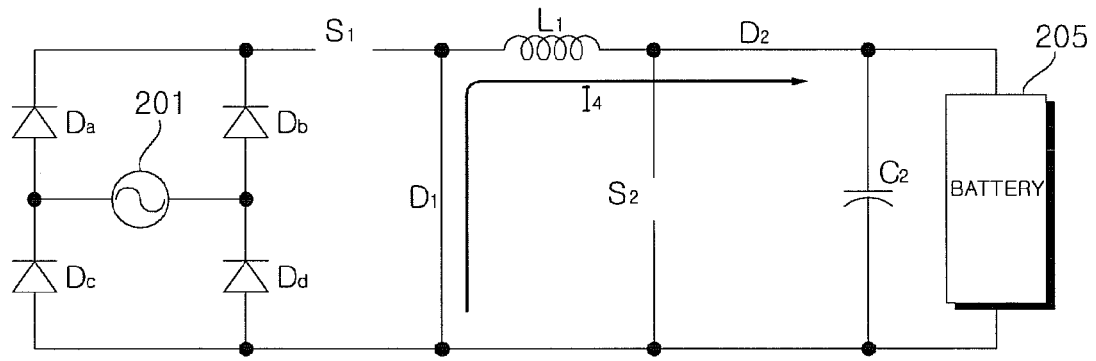

FIGS. 4C and 4D illustrate an exemplary operation of the first buck-boost converter 410a in a buck mode.

Referring to FIG. 4C, if the first buck switching element $S_1$ is turned on and the first boost switching element $S_2$ is turned off, current $I_3$ flows through the first buck switching element $S_1$, the first inductor $L_1$, and the second diode $D_2$. Then, DC power is stored in the capacitor $C_2$ and the battery 205 by the current $I_3$.

Referring to FIG. 4D, if both the first buck switching element $S_1$ and the first boost switching element $S_2$ in the first buck-boost converter 410a are turned off, current $I_4$ flows through the first diode $D_1$, the first inductor $L_1$, and the second diode $D_2$. Then energy accumulated in the first inductor $L_1$ in FIG. 4C is transferred to the capacitor $C_2$ and the battery 205 as the current $I_4$. Consequently, bucked DC power is stored in the battery 205.

Namely, in the buck mode, the first buck switching element $S_1$ in the first buck-boost converter 410a performs a turn on/off operation, i.e. a PWM operation and the first boost switching element S2 is kept off.

Meanwhile, the converter controller 415 may determine whether to operate in the boost mode, buck mode, or buck-boost mode, based on the output voltage $V_{c2}$ of the converter 410 sensed by the output voltage detector B, the target output voltage $V^*_{c2}$, and the input voltage $V_{c1}$ of the converter 410 sensed by the input voltage detector A.

For example, if the output voltage $V_{c2}$ of the converter 410 detected by the output voltage detector B is less than the target output voltage, the converter controller 415 may control the converter 410 to operate in the boost mode. That is, the converter controller 415 may control operation of the converter 410 as illustrated in FIGS. 4A and 4B.

As another example, if the output voltage $V_{c2}$ of the converter 410 detected by the output voltage detector B is greater than the target output voltage, the converter controller 415 may control the converter 410 to operate in the buck mode. That is, the converter controller 415 may control operation of the converter 410 as illustrated in FIGS. 4C and 4D.

Figure 4E:
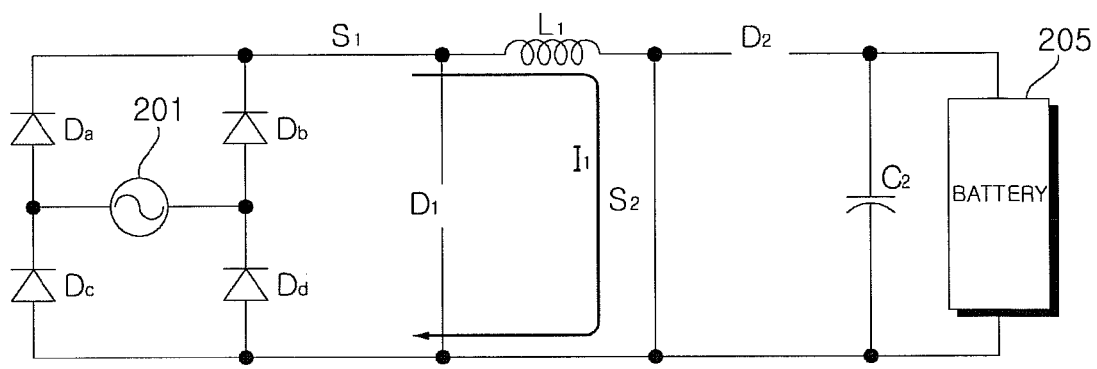
Figure 4F:
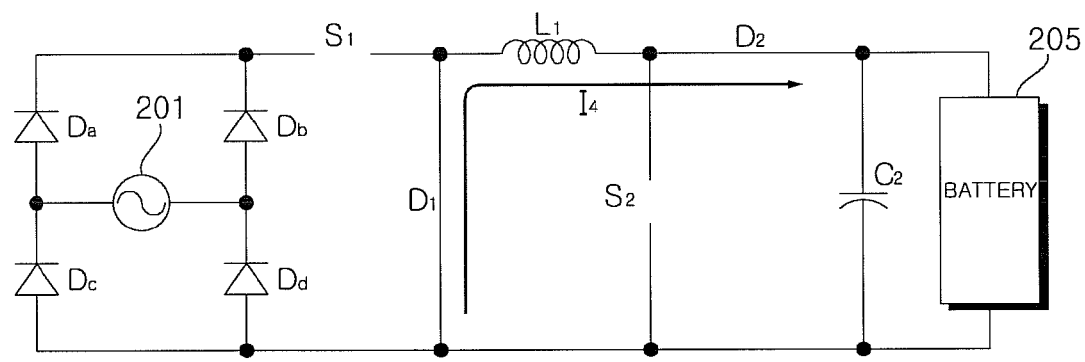

FIGS. 4E and 4F illustrate an exemplary operation of the first buck-boost converter 410a in the buck-boost mode.

Referring to FIG. 4E, if the first buck switching element $S_1$ and the first boost switching element $S_2$ in the first buck-boost converter 410a are turned on as illustrated in FIG. 4A, a closed loop is formed by the first buck switching element $S_1$, the first inductor $L_1$, and the first boost switching element $S_2$ so that the current $I_1$ flows. Then energy is accumulated in the inductor $L_1$ based on the current $I_1$. The second diode $D_2$ is not turned on.

Referring to FIG. 4F, if both the first buck switching element $S_1$ and the first boost switching element $S_2$ in the first buck-boost converter 410a are turned off as illustrated in FIG. 4D, the current $I_4$ flows through the first diode $D_1$, the first inductor $L_1$, and the second diode $D_2$. Then energy accumulated in the first inductor $L_1$ in FIG. 4E is transferred to the capacitor $C_2$ and the battery 205 as the current $I_4$. Consequently, DC power is stored in the battery 205.

Namely, in the buck-boost mode, the first buck switching element $S_1$ and the first boost switching element $S_2$ in the first buck-boost converter 410a perform a turn on/off operation, i.e. a PWM operation.

Meanwhile, operation of the second buck-boost converter 410b may be performed in the same manner as illustrated in FIGS. 4A to 4E.

According to the embodiment of the present invention, the converter controller 415 may control the first buck switching element $S_1$ and the first boost switching element $S_2$ in the first buck-boost converter 410a to be independently operated and may control the second buck switching element $S_3$ and the second boost switching element $S_4$ in the second buck-boost converter 410b to be independently operated, in the buck mode or buck-boost mode.

Figure 5A:
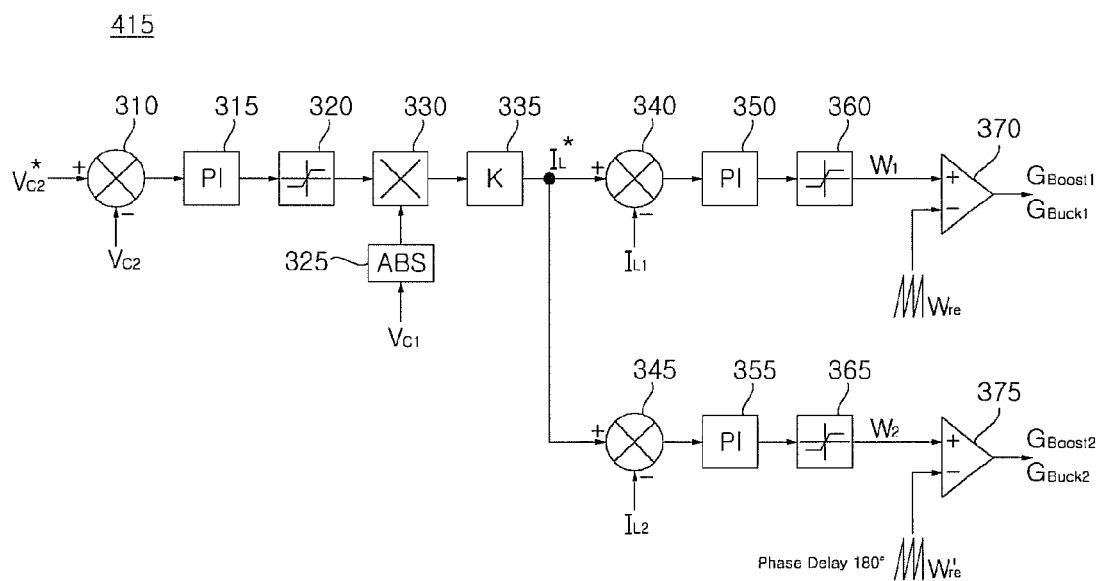
FIGS. 5A and 5B are block diagrams illustrating various examples of the internal configuration of a converter controller in FIG. 3.
Figure 5B:
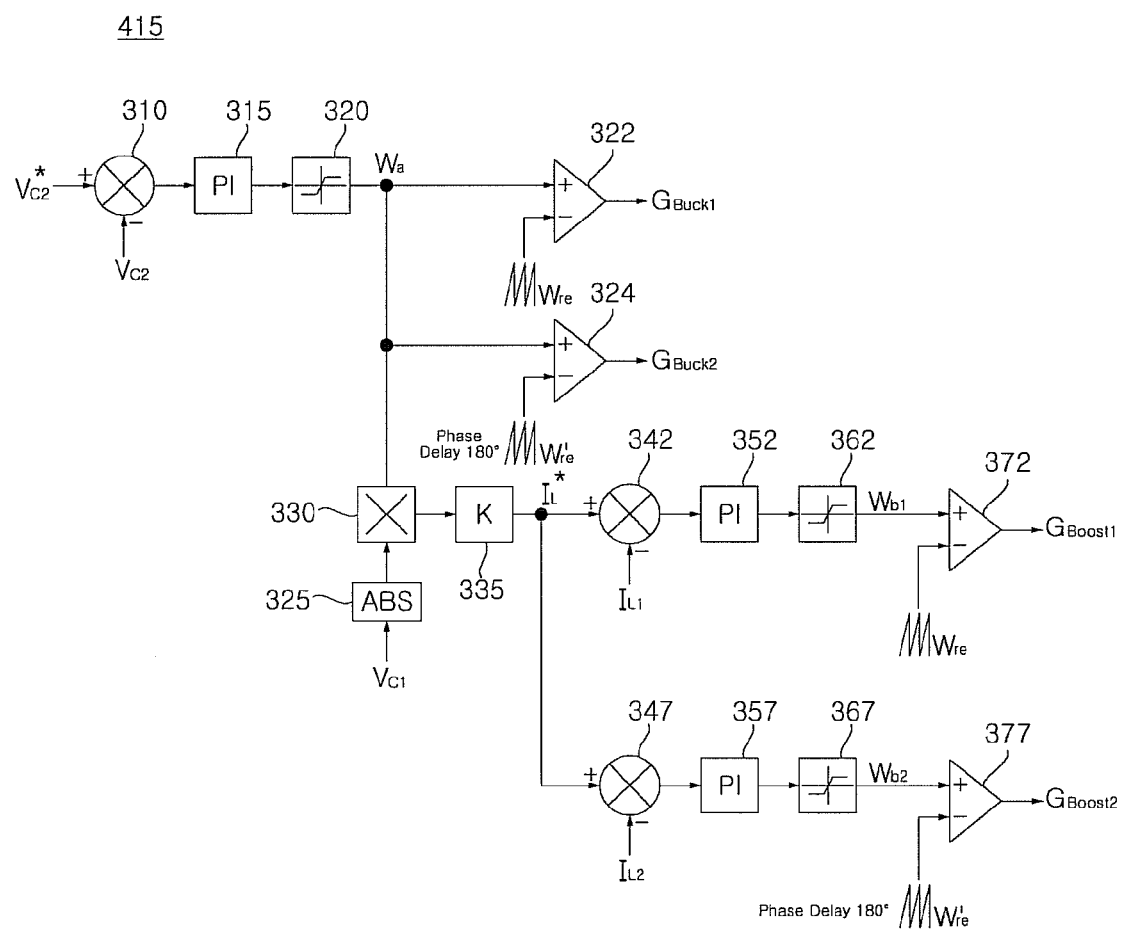
Figure 6:
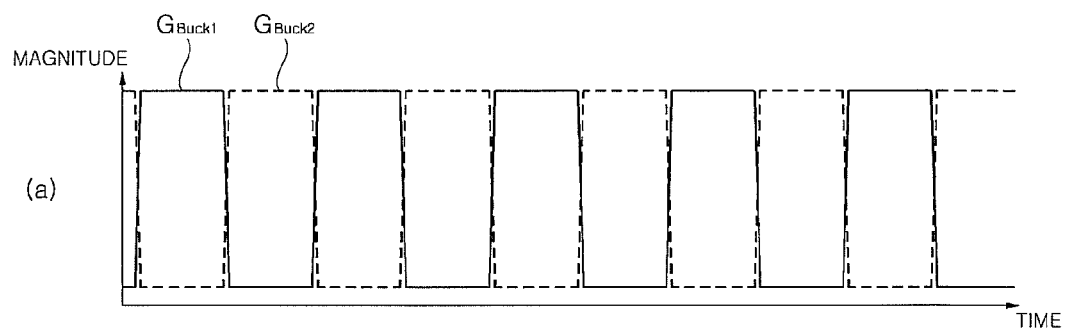
FIGS. 6A to 6C are diagrams illustrating waveforms of the converter controller of FIG. 5A.
Figure 6:
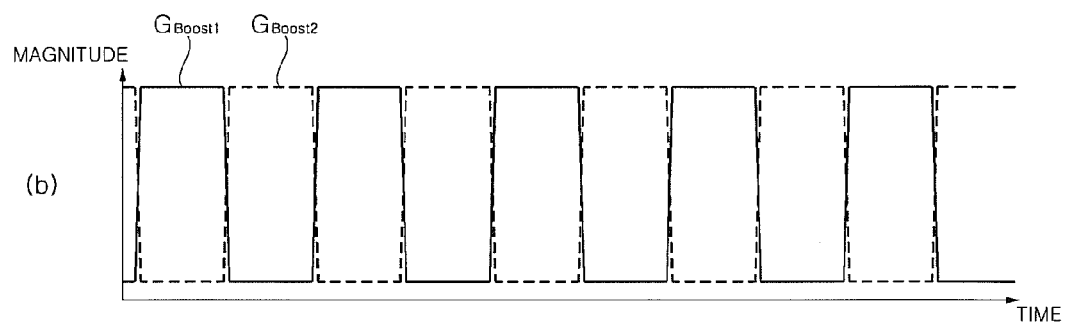
Figure 6:
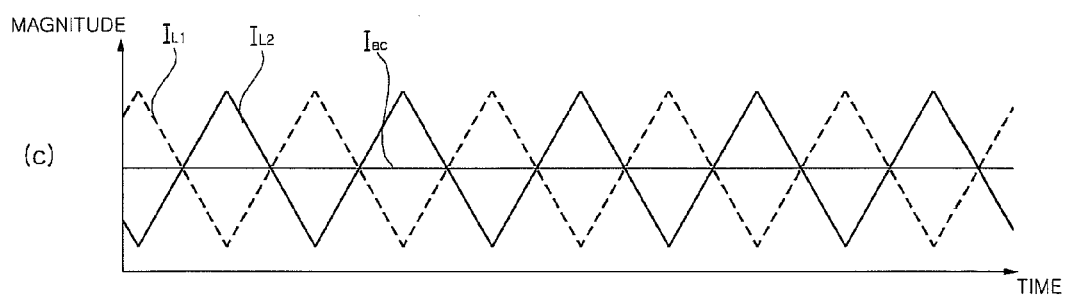

FIGS. 5A and 5B are block diagrams illustrating various examples of the internal configuration of the converter controller in FIG. 3. FIGS. 6A to 6C are diagrams illustrating waveforms of the converter controller of FIG. 5A and FIGS. 7A to 7C are diagrams illustrating waveforms of the converter controller of FIG. 5B.

Referring to FIG. 5A and FIGS. 6A to 6C, a first unit 310 of the converter controller 415 calculates a difference between the output voltage $V_{C2}$ of the converter 410 sensed by the output voltage detector B and the target output voltage $V^*_{C2}$. A proportional integral (PI) controller 315 performs PI control with respect to the difference. A limiter 320 limits an upper value and a lower value of a PI control value to prescribed ranges. A second unit 325 calculates the magnitude of the input voltage $V_{C1}$ of the converter 410 sensed by the input voltage detector A and a third unit 330 multiplies the magnitude of the input voltage $V_{C1}$ by an output value of the limiter 320. A fourth unit 335 multiplies a proportional constant by an output value of the third unit 335 to generate an inductor current command value $I^*_L$.

The fifth unit 340 calculates a difference between the inductor current command value $I^*_L$ and the current $I_{L1}$ detected by the first current detector. A PI controller 350 performs PI control with respect to the difference between the inductor current command value $I^*_L$ and the current $I_{L1}$. A limiter 360 limits an upper value and a lower value of a PI control value to prescribed ranges. A comparator 370 compares an output value $W_1$ of the limiter 360 with a reference waveform $W_{re}$ and generates a first buck switching control signal $G_{BUCK1}$, which controls the first buck switching element $S_1$, and a first boost switching control signal $G_{BOOST1}$, which controls the first boost switching element $S_2$.

A sixth unit 345 calculates a difference between the inductor current command value $I^*_L$ and the current $i_{L2}$ sensed by the second current detector. A PI controller 355 performs PI control with respect to the difference between the inductor current command value $I^*_L$ and the current $i_{L2}$. A limiter 365 limits an upper value and a lower value of a PI control value to prescribed ranges. A comparator 375 compares an output value $W_2$ of the limiter 365 with a reference waveform $W'_{re}$ with a 180-degree phase delay and generates a second buck switching control signal $G_{BUCK2}$ to control the second buck switching element $S_3$ and a second boost switching control signal $G_{BOOST2}$ to control the second boost switching element $S_4$.

It can be appreciated in FIG. 5A that the same first buck switching control signal $G_{BUCK1}$ and first boost switching control signal $G_{BOOST1}$ are generated through the comparator 370 and the same second buck switching control signal $G_{BUCK2}$ and second boost switching control signal $G_{BOOST2}$ are generated through the comparator 375.

That is, the first buck switching control signal $G_{BUCK1}$ and first boost switching control signal $G_{BOOST1}$ may be the same and the second buck switching control signal $G_{BUCK2}$ and second boost switching control signal $G_{BOOST2}$ may be the same, as illustrated in FIGS. 6A and 6B.

FIGS. 6A and 6B illustrate, in the buck-boost mode, the first buck switching control signal $G_{BUCK1}$ f first boost switching control signal $G_{BOOST1}$, second buck switching control signal $G_{BUCK2}$, and second boost switching control signal $G_{BOOST2}$. An another example, in the buck mode, the first boost switching control signal $G_{BOOST1}$ and the second boost switching control signal $G_{BOOST2}$ may be low level signals rather than PWM signals.

Since the reference signal $W_{re}$ input to the comparator 370 and the reference signal $W'_{re}$ input to the comparator 375 have a phase difference of 180 degrees therebetween, the first buck switching control signal $G_{BUCK1}$ and the second buck switching control signal $G_{BUCK2}$ are complementarily turned on/turned off.

That is, the first buck-boost converter 410a and the second buck-boost converter 410b perform an interleaving operation so that the turn-on duty of the first buck-boost converter 410a and the turn-on duty of the second buck-boost converter 410b do not overlap. Then, voltages can be controlled by current distribution caused by the interleaving operation. Accordingly, a current level flowing into internal circuit elements is lowered and thus durability of the circuit elements is improved. As a result, charging can be stably performed.

FIG. 6C illustrates ripples of the current $I_{L1}$ flowing into the first inductor $L_1$ and the current $I_{L2}$ flowing into the second inductor $L_2$, by the turned-on/turned-off operations which do not overlap. It can be appreciated that the ripples are formed based on an input current $I_{ac}$.

As a result, current flowing into the capacitor $C_2$ via the first inductor $L_1$ and the second inductor $L_2$ is the sum of the current $I_{L1}$ flowing into the first inductor $L_1$ and the current $I_{L2}$ flowing into the second inductor $L_2$ according to interleaving driving and may correspond to the input current Iac. That is, the ripples are considerably reduced.

Figure 7:
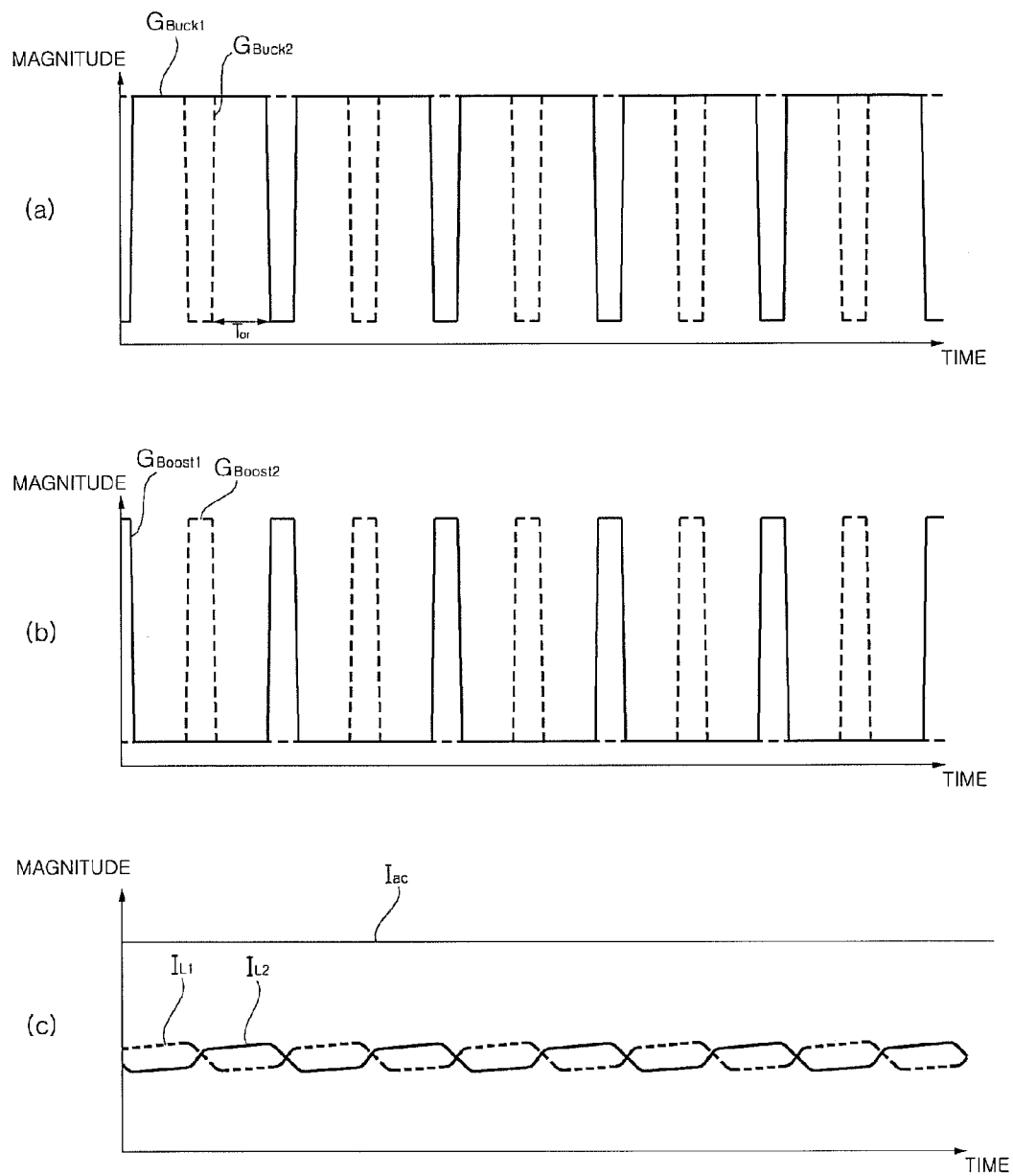
FIGS. 7A to 7C are diagrams illustrating waveforms of the converter controller of FIG. 5B.

According to another exemplary embodiment of the present invention, switching control signals as illustrated in FIGS. 7A to 7C are generated by the configuration of the converter controller 415 as illustrated in FIG. 5B.

Referring to FIG. 5B and FIGS. 7A to 7C, a first unit 310 in the converter controller 415 calculates a difference between the output voltage $V_{C2}$ of the converter 410 sensed by the output voltage detector B and the target output voltage $V^*_{C2}$. A PI controller 315 performs PI control with respect to the difference between the output voltage $V_{C2}$ and the target output voltage $V^*_{C2}$. A limiter 320 limits an upper value and a lower value of a PI control value to prescribed ranges.

A comparator 322 compares an output value $W_a$ of the limiter 320 with a reference waveform $W_{re}$ and generates the first buck switching control signal $G_{BUCK1}$ to control the first buck switching element $S_1$.

Separately from the comparator 322, a comparator 324 compares the output value $W_a$ of the limiter 320 with a reference waveform $W'_{re}$ with a 180-degree phase delay and generates the second buck switching control signal $G_{BUCK2}$ to controlling the second buck switching element $S_3$.

Thus, the converter controller 415 independently generates the first buck switching control signal $G_{BUCK1}$ and the second buck switching control signal $G_{BUCK2}$.

A second unit 325 calculates the magnitude of the input voltage $V_{C1}$ of the converter 410 sensed by the input voltage detector A and a third unit 330 multiplies the magnitude of the input voltage $V_{C1}$ by the output value $W_a$ of the limiter 320. A fourth unit 335 multiplies a proportional constant by an output value of the third unit 335 to generate the inductor current command value $I^*_L$.

A seventh unit 342 calculates a difference between the inductor current command value $I^*_L$ and the current $i_{L1}$ detected by the first current detector. A PI controller 352 performs PI control with respect to the difference between the inductor current command value $I^*_L$ and the current $i_{L1}$. A limiter 362 limits an upper value and a lower value of a PI control value to prescribed ranges. A comparator 372 compares an output value $W_{b1}$ of the limiter 362 with the reference waveform $W_{re}$ and generates the first boost switching control signal $G_{BOOST1}$ to control the first boost switching element $S_2$.

An eighth unit 347 calculates a difference between the inductor current command value $I^*_L$ and the current $i_{L2}$ sensed by the second current detector and a PI controller 357 performs PI control with respect to the difference between the inductor current command value $I^*_L$ and the current $i_{L2}$. A limiter 367 limits an upper value and a lower value of a PI control value to prescribed ranges. A comparator 377 compares an output value $W_{b2}$ of the limiter 367 with the reference waveform $W'_{re}$ with a 180-degree phase delay and generates a second boost switching control signal $G_{BOOST2}$ to control the second boost switching element $S_4$.

Thus, the converter controller 415 independently generates the first boost switching control signal $G_{BOOST1}$ and the second boost switching control signal $G_{BOOST2}$.

Further, the converter controller 415 independently generates the first buck switching control signal $G_{BUCK1}$, the second buck switching control signal $G_{BUCK2}$, the first boost switching control signal $G_{BOOST1}$, and the second boost switching control signal $G_{BOOST2}$.

Since the reference signal $W_{re}$ input to the comparator 322 and the reference signal $W'_{re}$ input to the comparator 324 have a phase difference of 180 degrees therebetween, the first buck switching control signal $G_{BUCK1}$ and the second buck switching control signal $G_{BUCK2}$ are alternately turned on/turned off and partially overlap as illustrated in FIG. 7A.

In the buck mode or buck-boost mode, timings of the first buck switching element $S_1$ and the second buck switching element $S_3$ partially overlap and thus current sharing occurs between the first buck-boost converter 410a and the second buck-boost converter 410b. Therefore, an output voltage level can be improved. Furthermore, an interleaving operation in the buck mode or buck-boost mode in which an output voltage is low can be improved. That is, the battery can be charged by stably converting input AC power into DC power.

Meanwhile, since the reference signal $W_{re}$ input to the comparator 362 and the reference signal $W'_{re}$ input to the comparator 367 have a phase difference of 180 degrees therebetween, the first boost switching control signal $G_{BOOST1}$ and the second boost switching control signal $G_{BOOST2}$ are alternately turned on/turned off.

If the interleaved buck-boost converter 410 operates in the buck mode or buck-boost mode as illustrated in FIG. 7A, timings of the first buck switching element $S_1$ and the second buck switching element $S_3$ partially overlap. Then ripples of the current $I_{L2}$ flowing into the first inductor $L_1$ and the current $I_{L2}$ flowing into the second inductor $L_2$ are considerably reduced as illustrated in FIG. 7C and, especially, are remarkably lower than the input current $I_{ac}$ from input AC power.

Accordingly, stability of circuit elements in the interleaved buck-boost converter 410 is improved.

Figure 8:
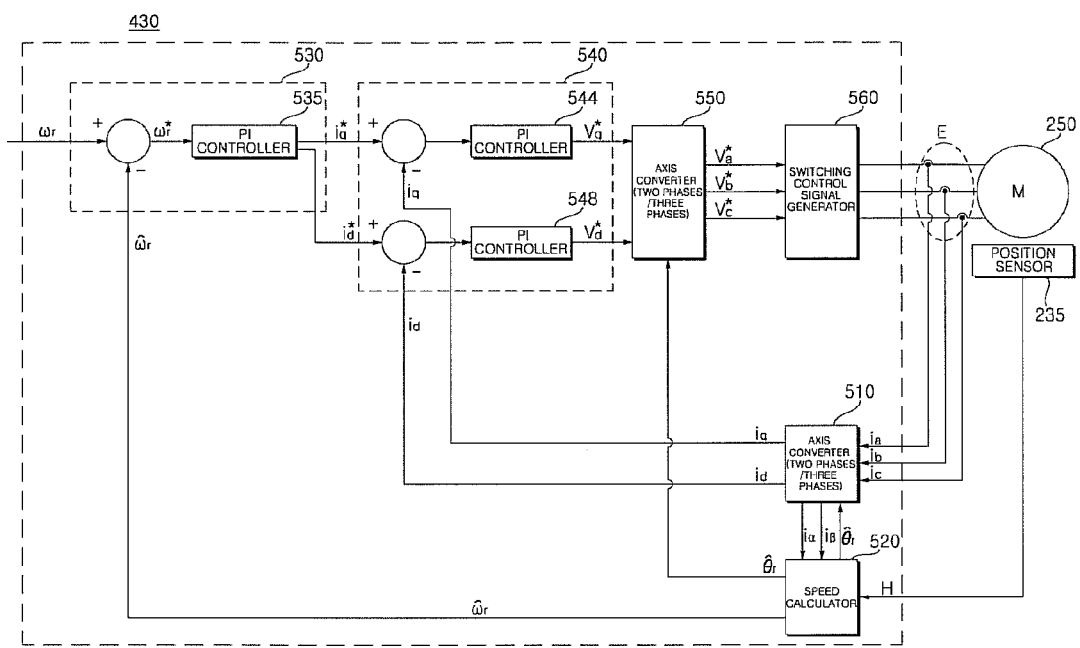
FIG. 8 is a block diagram illustrating the internal configuration of an inverter controller in FIG. 2.

FIG. 8 is a block diagram illustrating the internal configuration of the inverter controller in FIG. 2.

The inverter controller 430 may include an axis converter 510, a speed calculator 520, a current command generator 530, a voltage command generator 540, an axis converter 550, and a switching control signal generator 560.

The axis converter 510 receives three-phase output currents and $i_a$, $i_b$, and $i_c$ detected by an output current detector E and converts the three-phase output currents $i_a$, $i_b$, and $i_c$ into two-phase currents $i_\alpha$ and $i_\beta$ of a stationary coordinate system.

The axis converter 510 may convert the two-phase currents $i_\alpha$ and $i_\beta$ of the stationary coordinate system into two-phase currents $i_d$ and $i_q$ of a rotating coordinate system.

The speed calculator 520 may calculate a speed $\hat{\omega}_r$ based on a position signal H of the rotor input from a position sensor 235. Namely, the speed may be calculated by dividing the position signal by time.

The position sensor 235 may sense the position of the rotor of the motor 230. To this end, the POSITION SENSOR may include a hall sensor.

The speed calculator 520 may generate a calculated position $\hat{\theta}_r$ and a calculated speed $\hat{\omega}_r$.

The current command generator 530 calculates a speed command value $\omega^*_r$ based on the calculated speed $\hat{\omega}_r$ and a target speed $\omega$ and generates a current command value $i^*_q$ based on the speed command value $\omega^*_r$. For example, the current command generator 530 may perform PI control through the PI controller 535, based on the speed command value $\omega^*_r$ which is a difference between the calculated speed $\hat{\omega}_r$ and the target speed $\omega$ and generate the current command value $i^*_q$. While the q-axis current command $i^*_q$ is illustrated as a current command value in FIG. 8, it is possible to generate a d-axis current command value $i^*_d$ as well. The d-axis current command value $i^*_d$ may be set to 0.

The current command generator 530 may further include a limiter (not shown) to limit a current level so that the current command value $i^*_q$ does not exceed an allowed range.

The voltage command generator 540 generates d-axis and q-axis voltage command values $v^*_d$ and $v^*_q$ based on d-axis and q-axis currents $i_d$ and $i_q$ which are axis-converted into a two-phase rotating coordinate system by the axis converter 550 and on the current command values $i^*_d$ and $i^*_q$ generated from the current command generator 530. For example, the voltage command generator 540 performs PI control through the PI controller 544 based on a difference between the q-axis current $i_q$ and the q-axis current command value $i^*_q$ and may generate the q-axis voltage command value $v^*_q$. The voltage command generator 540 performs PI control through the PI controller 548 based on a difference between the d-axis current $i_d$ and the d-axis current command value $i^*_d$ and may generate the d-axis voltage command value $v^*_d$. The d-axis voltage command value $v^*_d$ may be set to 0 in correspondence to the case in which the d-axis current value $i^*_d$ is set to 0.

The voltage command generator 540 may further include a limiter (not shown) to limit a voltage level so that the d-axis and q-axis voltage command values $v^*_d$ and $v^*_q$ do not exceed an allowed range.

The generated d-axis and q-axis voltage commands $v^*_d$ and $v^*_d$ are input to the axis converter 550.

The axis converter 550 receives the position value $\hat{\omega}_r$ calculated by the speed calculator 520 and the d-axis and q-axis voltage command values $v^*_d$ and $v^*_q$ and performs axis conversion.

The axis converter 550 converts the two-phase rotating coordinate system into the two-phase stationary coordinate system. In this case, the position value $\hat{\omega}_r$ calculated by the speed calculator 520 may be used.

Then the axis converter 550 converts the two-phase stationary coordinate system into the three-phase stationary coordinate system to generate three-phase output voltage command values $v^*_a$, $v^*_b$, and $v^*_c$.

The switching control signal generator 560 generates an inverter switching control signal $S_{ic}$ according to a PWM scheme based on the three-phase output voltage command values $v^*_a$, $v^*_b$, and $v^*_c$.

The generated inverter switching control circuit $S_{ic}$ may be converted into a gate driving signal by a gate driver (not shown) and input to a gate of each switching element in the inverter 420. Then switching elements Sa, S'a, Sb, S'b, Sc, and S'c in the inverter 420 perform a switching operation.

According to the embodiment of the present invention, the charging apparatus and the electric vehicle including the same can control voltage by current distribution caused by an interleaving operation by using the interleaved buck-boost converter which DC power is charged to the battery.

Since the buck-boost converter includes the first boost switching element, the first buck switching element connected to the rectifier, the inductor connected between the first buck switching element and the first boost switching element, the first diode connected in parallel between the first buck switching element and the inductor, and the second diode connected between the first boost switching element and the output of the converter, the capacitor having a large rated voltage need not be used between the first buck switching element and the first boost switching element. Accordingly, internal circuit configuration of the apparatus is simplified and volume and manufacturing costs are reduced.

In addition, in a buck mode or a buck-boost mode, since a turn-on timing of the first buck switching element in the first buck-boost converter and a turn-on timing of the second buck switching element in the second buck-boost converter partially overlap, an interleaving operation in the buck mode or buck-boost mode having a low output voltage can be improved. That is, the battery can be charged by stably converting input AC power into DC power.

Meanwhile, the buck switching element and the boost switching element in each buck-boost converter are independently operated so that the battery can be charged by stably converting AC power into DC power.

Furthermore, since each buck-boost converter uses a common inductor in a buck mode or boost mode, internal circuit configuration of the charging apparatus is simplified, volume of the changing apparatus is reduced, and efficiency is improved.

The charging apparatus and the electric vehicle including the same according to the embodiments of the present invention are not limitedly applied to the configuration and method of the above-described embodiments. Rather, all or a part of the embodiments may be selectively combined to carry out various modifications of the above embodiments.

The operating method of the charging apparatus of the present invention may be implemented using a recording medium which can be read by a processor included in the charging apparatus as code which can be read by the processor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A charging apparatus, comprising:
   a rectifier to rectify input alternating current (AC) power in a charging mode;
   an interleaved buck-boost converter to convert the rectified power into direct current (DC) power to supply the converted DC power to a battery, the interleaved buck-boost converter including a plurality of buck-boost converters; and
   a converter controller to control the interleaved buck-boost converter,
   wherein a first buck-boost converter of the interleaved buck-boost converter includes,
   a first buck switching element connected to the rectifier,
   a first boost switching element,
   a first inductor connected between the first buck switching element and the first boost switching element,
   a first diode connected in parallel between the first buck switching element and the first inductor, and
   a second diode connected between the first boost switching element and an output of the interleaved buck-boost converter.

2. The charging apparatus according to claim 1, wherein each of the plurality of buck-boost converters performs an interleaving operation, and a turn-on timing of the first buck switching element and a turn-on timing of a second buck switching element in a second buck-boost converter of the interleaved buck-boost converter partially overlap in a buck mode or a buck-boost mode.

3. The charging apparatus according to claim 1, wherein the first buck-boost converter commonly uses the first inductor during operation in a buck mode and operation in a boost mode.

4. The charging apparatus according to claim 1, wherein the converter controller adjusts a turn-on duty of the first buck switching element to control an output voltage generated from the first buck-boost converter and adjusts a turn-on duty of the first boost switching element to control power factor of an output voltage or an output current generated from the first buck-boost converter.

5. The charging apparatus according to claim 1, wherein the converter controller adjusts a turn-on duty of each buck switching element in the plurality of buck-boost converters to control output voltages generated from the plurality of buck-boost converters and adjusts a turn-on duty of each boost switching element in the plurality of buck-boost converters to control each power factor of output voltages or output currents generated from the plurality of buck-boost converters.

6. The charging apparatus according to claim 1, further comprising:
   a first capacitor connected to an output of the rectifier
   a second capacitor connected to the output of the interleaved buck-boost converter;
   an input voltage detector to detect an output voltage of the rectifier;
   an output voltage detector to detect an output voltage of the interleaved buck-boost converter; and
   a current detector to detect current flowing into each inductor in the plurality of buck-boost converters of the interleaved buck-boost converter.

7. The charging apparatus according to claim 1, wherein, in a buck mode or a buck-boost mode, the first buck switching element and the first boost switching element are independently operated and a second buck switching element and a second boost switching element in a second buck-boost converter connected in parallel to the first buck-boost converter are independently operated.

8. The charging apparatus according to claim 1, wherein the converter controller determines a turn-on duty of the first buck switching element in the first buck-boost converter and a turn-on duty of a second buck switching element in a second buck-boost converter connected in parallel with the first buck-boost converter, based on an output voltage of the interleaved buck-boost converter and a target output voltage.

9. The charging apparatus according to claim 1, wherein the converter controller determines
   a turn-on duty of the first boost switching element, based on an output voltage of the interleaved buck-boost converter, a target output voltage, an input voltage of the interleaved buck-boost converter, and current flowing into the first inductor in the first buck-boost converter, and
   a turn-on duty of a second boost switching element in a second buck-boost converter connected in parallel with the first buck-boost converter, based on the output voltage of the interleaved buck-boost converter, the target output voltage, the input voltage of the interleaved buck-boost converter, and current flowing into a second inductor in the second buck-boost converter.

10. The charging apparatus according to claim 1, wherein a second buck-boost converter connected in parallel with the first buck-boost converter includes:
    a second boost switching element
    a second buck switching element connected to the rectifier,
    a second inductor connected between the second buck switching element and the second boost switching element,
    a third diode connected in parallel between the second buck switching element and the second inductor, and
    a fourth diode connected between the second boost switching element and the output of the interleaved buck-boost converter.

11. The charging apparatus according to claim 1, wherein the other converters, except for the first buck-boost converter among the plurality of buck-boost converters, have the same configuration as the first buck-boost converter and are connected in parallel with the first buck-boost converter.

12. An electric vehicle, comprising:
    a battery;
    a motor;
    an inverter to convert direct current (DC) power provided from the battery into alternating current (AC) power to drive the motor, in a motor operation mode; and
    a charging apparatus including a rectifier to rectify input AC power in a charging mode, an interleaved buck-boost converter to convert the rectified power into DC power to supply the converted DC power to the battery, the interleaved buck-boost converter including a plurality of buck-boost converters, and a converter controller to control the interleaved buck-boost converter,
    wherein a first buck-boost converter of the interleaved buck-boost converter includes,
    a first buck switching element connected to the rectifier,
    a first boost switching element,
    a first inductor connected between the first buck switching element and the first boost switching element,
    a first diode connected in parallel between the first buck switching element and the first inductor, and
    a second diode connected between the first boost switching element and an output of the interleaved buck-boost converter.

13. The electric vehicle according to claim 12, wherein the converter controller adjusts a turn-on duty of the first buck switching element to control an output voltage generated from the interleaved buck-boost converter and adjusts a turn-on duty of the first boost switching element to control power factor of an output voltage or an output current generated from the interleaved buck-boost converter.

14. The electric vehicle according to claim 12, wherein the charging apparatus further includes:
   a first capacitor connected to an output of the rectifier
   a second capacitor connected to the output of the interleaved buck-boost converter;
   an input voltage detector to detect an output voltage of the rectifier;
   an output voltage detector to detect an output voltage of the interleaved buck-boost converter; and
   a current detector to detect current flowing into each inductor in the plurality of buck-boost converters of the interleaved buck-boost converter.

15. The electric vehicle according to claim 12, wherein, in a buck mode or a buck-boost mode of the charging apparatus, the first buck switching element and the first boost switching element in the first buck-boost converter are independently operated and a second buck switching element and a second boost switching element in a second buck-boost converter connected in parallel to the first buck-boost converter are independently operated.

16. The electric vehicle according to claim 12, wherein the converter controller determines
   a turn-on duty of the first boost switching element, based on an output voltage of the interleaved buck-boost converter, a target output voltage, an input voltage of the interleaved buck-boost converter, and current flowing into the first inductor in the first buck-boost converter, and
   a turn-on duty of a second boost switching element in a second buck-boost converter connected in parallel with the first buck-boost converter, based on the output voltage of the interleaved buck-boost converter, the target output voltage, the input voltage of the interleaved buck-boost converter, and current flowing into a second inductor in the second buck-boost converter.

17. The electric vehicle according to claim 12, further comprising:
   an inverter controller to control the inverter,
   wherein the inverter controller includes,
   a speed calculator to calculate speed information of a rotor of the motor, based on detection current flowing into the motor or a position signal of the rotor of the motor,
   a current command generator to generate a current command value based on the speed information and a speed command value,
   a voltage command generator to generate a voltage command value based on the current command value and the detection current; and
   a switching control signal generator to generate a switching control signal to drive the inverter based on the voltage command value.

* * * * *